Jan. 26, 1965 J. A. McINERNEY 3,167,087
CONCENTRIC DUCT VALVE CONSTRUCTION
Filed April 30, 1962 2 Sheets-Sheet 1

Inventor,
John A. McInerney
By Joseph O. Lang
Atty

Jan. 26, 1965  J. A. McINERNEY  3,167,087
CONCENTRIC DUCT VALVE CONSTRUCTION
Filed April 30, 1962  2 Sheets-Sheet 2

Inventor.
John A. McInerney,
By Joseph O. Lange
Atty.

United States Patent Office 3,167,087
Patented Jan. 26, 1965

3,167,087
CONCENTRIC DUCT VALVE CONSTRUCTION
John A. McInerney, Evergreen Park, Ill., assignor to Crane Co., Chicago, Ill., a corporation of Illinois
Filed Apr. 30, 1962, Ser. No. 191,126
6 Claims. (Cl. 137—375)

This invention relates generally to concentric duct or jacketed valves or like vessels. More particularly, the invention is concerned with a particular type of the latter construction in which inner and outer valve bodies or casings are provided, so mounted relative to each other that temperature and pressure differences normally existing are avoided during start-up, normal operation and shut-down, thereby eliminating such stresses as radial, axial, and hoop.

At the outset, in order to have a better appreciation of the background of this invention, it should be understood that in connection with pipe lines where there are temperature and pressure differentials existing the valves for such lines must be so designed as to avoid the usual tie-in constructions, tthe latter being impractical because of the objectionable stresses created as above specifically mentioned.

Also in valves for such unusually severe services, for example, in such services involving temperatures of the order of 1500° F., and wherein valves are held to extremely high standards of performance and subject to inspection during fabrication, as well as radiography and testing, these requirements present unique problems. Specifically, valves of this general character are intended for use on helium gas lines in which the inner portion of the valve body or casing may be suitable for approximately 425 pounds per square inch pressure and 1500° F., the gas being handled being helium or the like, while the outer duct of the assembly, also suitable for the gas referred to, should be capable of service at about 450 pounds per square inch pressure at 600° F. In the latter connection, it should be understood as will hereinafter be more apparent the difference in pressure between the respective casings provides that the higher pressure in the outer duct or casing prevents any leakage from the inner duct or casing outwardly.

The mounting or tie-in between the respective casings must be such as to present unusual flexibility in the tie-in construction between the respective inner and outer valve bodies or casings in their normal assembly.

Therefore, an important object of this invention is to provide for a jacketed type of valve construction, in which the arrangement for such jacketing permits of a relatively easy and economical fabrication, while at the same time it permits convenient radiography and testing of the valve assembly, preferably during the course of such assembly. Specifically, the respective ducts or casings as will hereinafter be apparent are capable of radiographic and other inspection prior to their tie-in assembly.

Therefore, it is one of the more important objects to provide what is termed in the art as a floating body construction in which the inner valve body and the outer valve body constitute separate units.

Another object of the invention is to provide for a jacketed valve in which a parallel disc conduit-type gate valve may be employed, either suitable for integral fluid driven piston actuation or hand operation.

Another object of this invention is to provide a construction in which such conduit type gate valves permit of the valve body run being bridged by a disc or closure member carrier with an insulation arrangement complementary to that employed by the valve casing.

A further object is to provide for a valve construction in which in the closed position a pair of separate circular spring loaded discs are positioned against the respective casing seat rings and are seated by means of fluid pressure acting between the disc when a suitable body pressurizing valve is opened.

It is a further object to provide for closure discs of a circular form in order to minimize distortion in the normal course of service.

A further object of this invention is to provide for a jacketed valve in which the inner valve of such assembly at its upper and lower portions is provided with suitable bleed piping conveniently arranged to cooperate with said upper and lower portions of the valve.

A further object is to provide for valve seat rings of a replaceable type, the latter being held in place by means of suitable bolts.

A further object is to provide for a valve in which the internal insulation is suitably mounted on the inside surface of the inner duct or body casing.

Another object is to provide for a valve construction in which the closure member guides may be suitably formed to increase the wear life of the guides by being easily or conveniently hard faced and preferably being held in a dove-tail slot in the inner body to permit convenient replacement.

Another important object of the guide construction referred to is to permit of such guides being suspended from an upper portion of the valve body, thereby to overcome the otherwise objectionable effects arising from thermal expansion or contraction and seriously interfering with the usual or normal valve guide assembly.

A further object lies in the provision that in permitting of the flexibility above referred to that relative movement is permitted between the inner and outer valve body and in which the inner body is supported on trunnions resting on plates secured to the inner surface of the outer body preferably at the central portion of the said latter body.

It is a further object to provide for a trunnion mounted body in which the trunnions are free to move in a plurality of directions on a pair of oppositely disposed fixedly mounted plates, the bellows construction described preferably being hard faced, for example, with surface deposited metals. Thus, the inner body is free to move slightly axially from the steam generator, for example, in such cases where the requirements of the installation so dictate.

As will hereinafter be apparent, the thermal effects in the inner valve or body casing are so arranged as not to be transmitted to the outer valve body and this also applies with respect to the thermal effects from the latter with respect to the inner valve.

A still further important object is to provide for a jacketed valve construction in which the assembly of the respective housings can be readily welded in the piping system without the development of the usual objectionable piping strains caused by welding, this advantage being gained by use of a floating inner body.

It will be appreciated that the outer duct axial stresses will not be developed as a result of weld metal shrinkage because the mounting of the floating inner body enables the latter to be free to move whereby to compensate for line strains.

A further provision of this invention is to provide for a valve stem mounting in which the relative movement of the latter member is substantially sealed hermetically with relation to the complete assembly, and thereby providing the flexibility required for such axial movement of the valve stem by means of a double bellows construction, the latter preferably being telescoped to each other.

It will be noted that the latter permits use of visual means for detection of leakage by bleed piping as hereinafter described.

Other important objects and advantages will become more readily apparent upon proceeding with the description read in light of the accompanying drawings, in which.

Similar reference numerals refer to similar parts throughout the several views.

Figure 1:
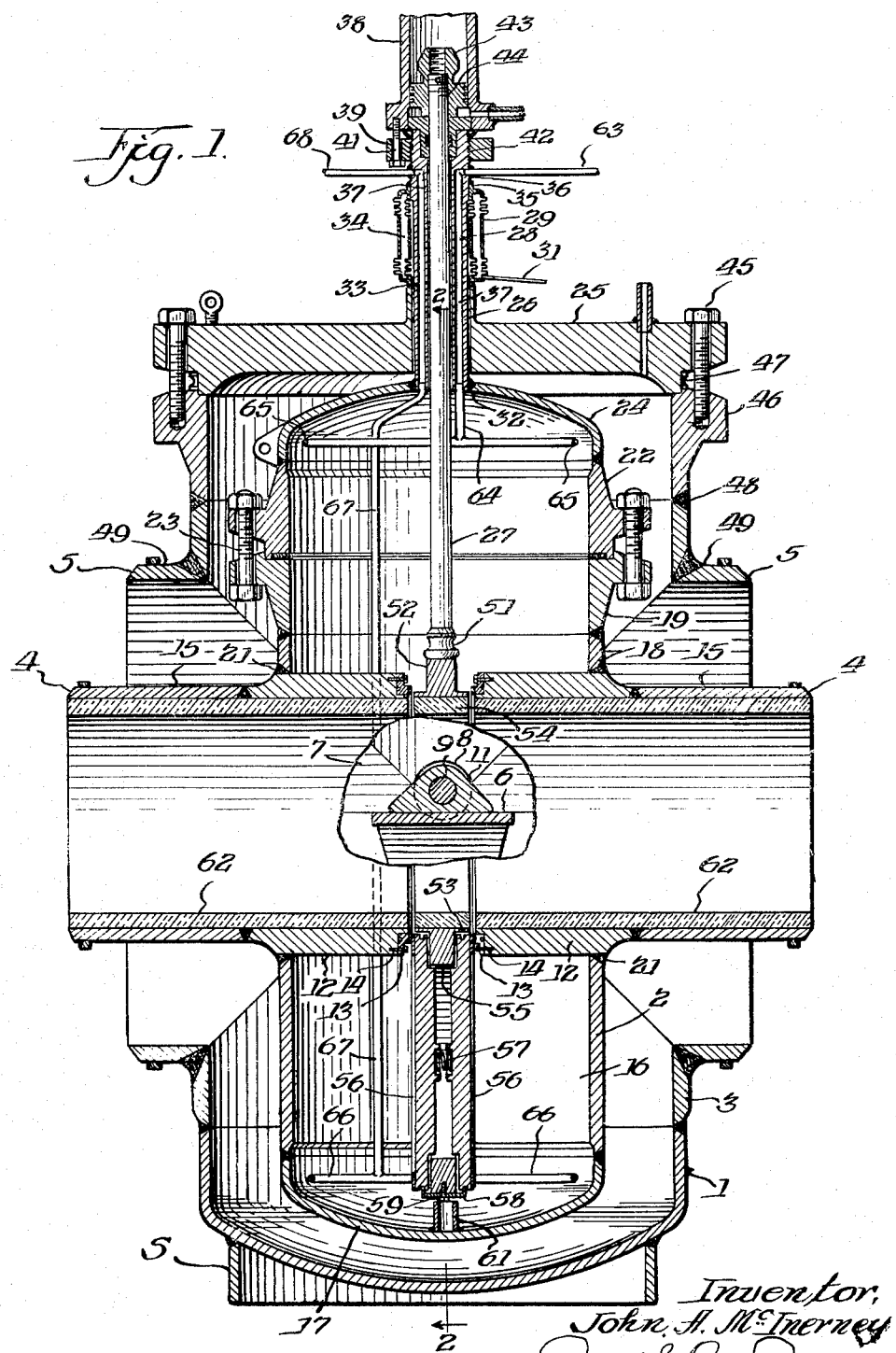
FIG. 1 is a sectional assembly view of a preferred embodiment of my invention.

Referring now to the drawings and specifically to FIG. 1, a casing generally designated 1 is indicated. The latter consists of an inner casing 2 and an outer casing 3, both the inner casing and the outer casing having means for suitable attachment to piping in telescoped arrangement whereby to provide for the inner attachment as at 4 for the inner casing to such pipe line and at 5 for attachment of the outer casing to the outer conduit of the said telescoped piping. It will be appreciated that the inner valve body and the outer valve body are complete separate units being weld assembled as indicated to form the respective inner and outer casings and provide for the floating support of the inner casing 2 by means within the outer casing as at 6 constituting a pair of shelves oppositely disposed and welded or otherwise secured to the inner surface 7 of the outer casing to receive the trunnion pad 8 having the trunnion portion or integral pin 9 within the roller plates 11.

The inner casing or body 2 is provided with the inwardly extending axial extensions 12 having at their innermost annular limits the body seat rings 13 and preferably bolted or otherwise attached as at 14 to the said inner limits of the members 12. To complete the attachment means, the inner casing as at 15 is provided with the annular extensions of pipe whereby to form the said connection with the inner pipe line at 4 prevously referred to. As indicated, the valve chamber 16 of the inner casing 2 is closed at its lower limits by means of the cap 17.

The upper portion of the inner body or casing likewiser is provided with a straddling annular member 18 to which the flange 19 is weld-attached as indicated. It will thus be appreciated that the inner casing portion 2 is transversely apertured in its side wall to receive the seat retaining members 12 and suitably welded thereto as indicated at 21. To complete the enclosure of the valve chamber 16 at its upper portion, the flange 22 is mounted upon the lower flange 19 and held in assembled relation thereto by means of the bolts and nuts generally designated 23. At the upper end portion of the flange 22, an inner casing bonnet or cover 24 is attached to the flange 22 in fluid sealing relation as indicated.

Projecting through the outer valve casing bonnet 25 is the annular extension 26, the valve stem 27 being journaled and housed in the said extension 26.

Under conditions of extreme severe service, it is desirable that the sealing of the stem be provided by suitable fluid sealing mechanism instead of the ordinary stuffing box, and these are specifically referred to as the inner bellows 28 and the outer bellows 29. Preferably, although not necessarily, the annular space between the respective inner and outer bellows 28 and 29 may have a leak detector tubing 31. Within the extension 26, a snugly fitted bushing surrounds the valve stem and provides a bearing therefor. The extension 26 is attached to the cover 24 of the inner casing 2 by means of the annular weld 32. The said extension 26 at its median is weld-attached to the inner bellows 28 as at 33, the latter bellows being so connected to the outer bellows 29 as to form a closed annular chamber 34. Thus, it will be appreciated that in collaboration with a leak detector, connected at 31, it can be determined if leakage occurs past the inner bellows 28 into the closed chamber 34.

As indicated at the upper portion of both bellows, the chamber 34 is sealed by means of the integral hub 35, the hub 35 being welded as at 36 to the tubular extension 26. Oppositely disposed ducts 37 are provided for reasons hereinafter explained. Suitably attached to the tubular extension 26, an actuating adapter 38 is attached to the flange 39 by means of cap screws 41, the flange 39 being threadedly attached to the upper end of the extension 26 as indicated at 42. Within the actuating adapter 38, a piston 43 is attached as at 44 to the stem 27 for effecting the reciprocating movement of the valve stem for reasons hereinafter made more clear.

The bonnet member 25 of the outer housing 3 is attached by means of studs 45 to engage the upper flange 46. Suitable seal weld means, as at 47, may be employed to effect a fluid tight connection between the respective bonnet 25 and the flange 46. The flange member 46 is attached to the outer casing 3 as by the annular weld 48 and having as described in connection with the inner casing 2 the lateral extensions 49 for attachment to the outer piping (not shown).

Referring now to the valve stem 27, it will be noted that at the lower poriton thereof, the stem 27 is provided at the T-head 51 for engagement of the disc carrier 52, the latter being apertured as at 53 to receive the annular insulation member 54. At its lower portion, the disc carrier 52 is apertured as at 55 to receive in shouldered relation thereto as indicated the oppositely disposed discs 56. Interposed between the said discs 56 in order to maintain the latter members in normal spaced-apart relation, a coiled spring 57 is shown suitably retained as indicated. A disc retaining plate 58 is provided with the flanges as indicated to engage the disc members 56 as illustrated. A suitable attachment cap screw 59 retains the member 58 to the carrier 52 and in the open position of the valve serves as the stop contact with the portion 61 provided on an inner surface of the lower cap 17. Thus, it will be appreciated that as the stem 27 is actuated by any suitable means for effecting reciprocation, the disc carrier supporting the discs 56 will be moved to open or closed position, depending upon the manner of actuation. Where large valves are employed, the outer valve casing 1 may be supported on a suitable stand S of generally cylindrical configuration as indicated to support the valve in a desired position. It will be noted that to coincide with the annular port positioned insulation member 54, the inside surfaces of the members 12 and 15 are suitably lined with a corresponding extension of such insulating member as indicated at 62.

It will be appreciated that because the jacketed valve of this invention is actually subjected to a plurality of line service conditions as distinguished from the normally singular type of condition means preferably must be taken to provide for ventilation or circulation or other reasons of the respective chambers constituting the jacket between the closure member and the respective inner and outer valve housings and this is done preferably by means of suitable upper and lower bleed piping. The upper bleed piping 63 connected to the inner duct 37, the latter member having tubing as at 64 with open ends at 65 thereby to supply to the upper portion of the valve chamber 16 the desired fluid to an extent sufficient to completely fill the lower portion of the valve chamber 16 and thereby connect with the outlet bleed piping as at 66 the latter portions being connected to the common outlet piping 67 to communicate with the other oppositely disposed duct 37 and thence to the outlet piping 68 for suitable connection to such container or atmosphere as may be selected, considering the nature of the installation.

Figure 2:
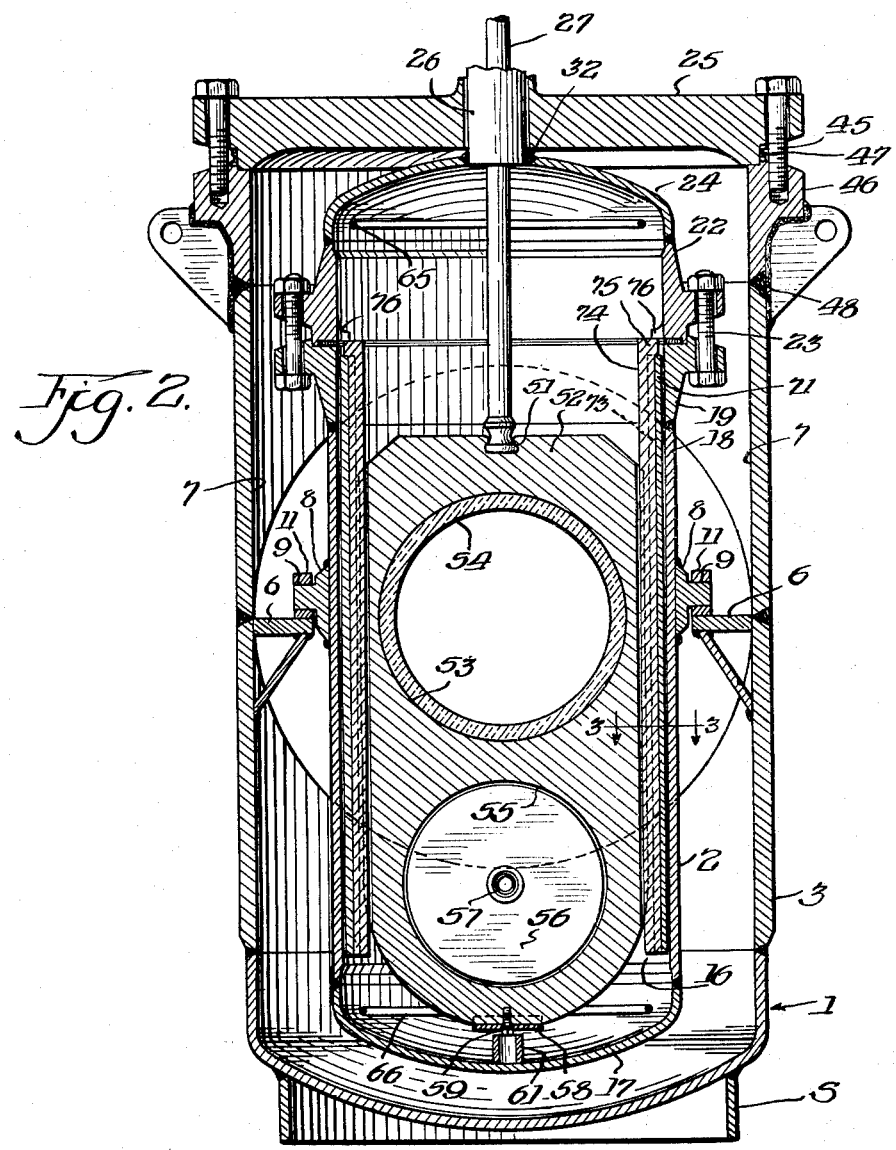
FIG. 2 is a sectional assembly view taken on the line 2—2 of FIG. 1.
Figure 3:
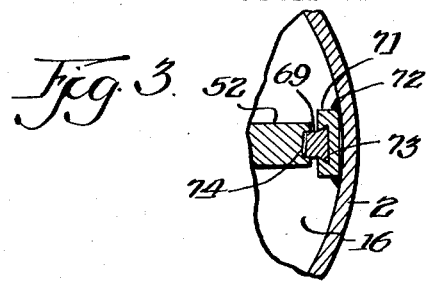
FIG. 3 is a fragmentary sectional view taken on the line 3—3 of FIG. 2.

While the foregoing bleed piping 63 and 68 has been described in the nature of a function of a flushing mechanism or the like, it will of course be understood that there is such versatility present in this piping to the extent that positive pressure may actually be introduced at 63 or 68 sufficient to be applied between the main valve closure discs 56 whereby to create a higher degree of fluid tightness in the valve closed position, the pressure acting between the discs and thereby to augment the spreading effect of the coil spring 57. In order to adequately guide the closure member 56 for the full length of travel in the course of its reciprocating movement within the inner housing 2, the latter is provided with the elongated guide strips 69 oppositely disposed and of the general cross sectional configuration shown in FIG. 3 and extends upwardly to a plane indicated by the shoulder 75 and for substantially the full depth of the valve chamber 16. In the guide construction, the guide member 69 is employed engaging the guide holder 71 which is also of elongated form as indicated in FIG. 2 and is weld attached as at 72 to the inner valve housing 2. Preferably, the guide strip 69 is dovetailed as at 73 to slidably engage the guide holder 71. The inner surface of the guide strip 69 is preferably hardened or hard faced to provide for a wear resisting surface 74 in its engagement with the disc carrier 52.

In connection with the mounting of the guide strip 69, it will be noted that the latter member, as more clearly shown in FIG. 2, is hooked outwardly as at 75 thereby to engage the upper limits of the holder 71 and preferably to restrain axial movement relative to the holder by means of the overlying lugs 76.

In connection with the above construction, it will be appreciated that the inner housing 2 and the outer housing 3 are separately assembled. As a matter of fact, both the inner casing as well as the outer casing are stress relieved and subsequently machined to be independent as complete housings. After such fabrication has been completed, the body seat rings 13 are applied to the inner casing by assembling the seat rings with the seat retaining means 14. Subsequently, the closure member consisting of the carrier 52 and the discs 56 are installed between the said seat rings assembled together with the stem 27 attached and in the guides 69. The entire inner bonnet assembly comprising the members 22, 24 and the stem enclosing structure immediately above member 24 is then mounted over the inner casing whereby to clamp the guide means 74 in place as previously referred to. The complete assembly is then lowered into the outer casing and supported in the outer casing by means of the trunnion pad 8 and trunnion position or integral pin 9 within the roller plates 11 supported by shelves 6. The outer bonnet 25 is then mounted in the position shown. The inner body seat retaining means 12 is then welded to annular pipe extensions 15. The internal insulation 54 and 62 is next applied within the ports as indicated. The bellows assembly enclosing the upper end portion of the stem and the bleed piping is then installed. The actuating mechanism is subsequently applied to such assembly.

I claim:
1. In a substantially concentric duct conduit gate valve; the combination including two hollow casings; one of said casings enclosing the other casing in spaced apart relation thereto; the inner one of said casings having oppositely disposed roller plates and trunnions with pads thereon for said trunnions; transversely projecting support means comprising oppositely disposed shelves interposed in the space between said casings in slidable engagement with said roller plates for support of the inner one of said casings; the said projecting support means permitting said inner casing to have limited rotative and transverse movements relative to the outer casing in a plurality of directions.

2. The subject matter of claim 1; an expandible closure member; the said outer casing having means exteriorly accessible for supplying a fluid to the inner casing and to the said expandible closure member to expand the latter member in the closed position of the valve.

3. The subject matter of claim 1, an expandible closure member in the inner casing; both of said casings having means cooperating with each other for supplying a fluid to an inner chamber of said inner casing and to the interior of expandible closure member to expand the latter member.

4. The subject matter of claim 3, an actuating stem for said closure member; the said inner casing having journaling means comprising an annular extension for said stem; the said journaling means providing a passageway comprising oppositely disposed ducts for at least a portion of its length; the latter ducts cooperating in supplying fluid for said expansion of said closure member.

5. The subject matter of claim 4, inner and outer bellows means respectively for said inner and outer casings and connected to said inner and outer casings to provide sealing means therebetween and permit relative movement between said inner and outer casings, the said inner bellows being attached to said annular extension for the valve stem.

6. In a substantially concentric duct conduit gate valve; the combination including two hollow casings; one of said casings enclosing the other casing in spaced apart relation thereto; the inner one of said casings having oppositely disposed spaced apart pivotal trunnions and roller plates; shelf means interposed between said casings for support of the inner one of said casings; the said shelf means being disposed on an inner surface of the outer casing in oppositely disposed spaced apart relation; the said shelf means cooperating with said pivotal trunnions and roller plates whereby to permit said inner casing to have limited movement relative to the outer casing in a plurality of directions while being supported on said shelf means.

References Cited by the Examiner

UNITED STATES PATENTS

| 1,274,715 | 8/18 | Hook et al. | 138—114 |
| 1,995,727 | 3/35 | Wetherbee | 137—375 XR |
| 2,301,428 | 11/42 | MacNeil | 137—375 XR |
| 2,444,958 | 7/48 | Smith | 4—41 |
| 2,531,658 | 11/50 | Walsh | 138—114 |
| 2,649,769 | 8/53 | Kaiser | 137—524 XR |
| 2,705,610 | 4/55 | Hjulian | 251—175 |

FOREIGN PATENTS 3,249 12/63 Great Britain.

MARTIN P. SCHWADRON, *Acting Primary Examiner.*

HENRY T. KLINKSIEK, *Examiner.*